United States Patent [19]

Ruhf

[11] 4,111,878
[45] Sep. 5, 1978

[54] WATER BASED INK COMPOSITION FOR VINYL FLOORING

[75] Inventor: Truman J. Ruhf, Emmaus, Pa.

[73] Assignee: GAF Corporation, New York, N.Y.

[21] Appl. No.: 712,086

[22] Filed: Aug. 5, 1976

[51] Int. Cl.² ............................................. C09D 3/80
[52] U.S. Cl. ...................... 260/29.6 ME; 260/29.6 E; 260/29.6 RB; 106/26; 106/30
[58] Field of Search ................. 260/29.6 ME, 29.6 E, 260/29.6 RB; 106/26, 30

[56] References Cited

U.S. PATENT DOCUMENTS

| 3,533,811 | 10/1970 | Clements et al. ................. 260/42.52 |
| 3,838,085 | 9/1974 | Myers et al. ................. 260/29.6 ME |
| 3,839,253 | 10/1974 | Kershaw et al. ............. 260/29.6 ME |
| 3,844,990 | 10/1974 | Lindemann et al. ......... 260/29.6 ME |
| 3,884,707 | 5/1975 | Dick et al. ...................... 260/29.6 R |
| 3,996,179 | 12/1976 | Haus et al. ...................... 260/29.6 R |

*Primary Examiner*—Eugene C. Rzucidlo
*Attorney, Agent, or Firm*—Walter C. Kehm; Joshua J. Ward

[57] ABSTRACT

Water based printing ink for vinyl flooring. The ink is a blend of acrylic and vinyl latexes and contains coalescing agent as well as surfactant and pigment.

6 Claims, No Drawings

WATER BASED INK COMPOSITION FOR VINYL FLOORING

BACKGROUND OF THE INVENTION

Water based inks are well known for use on a wide variety of substrates. Such inks are generally latex emulsion or dispersion systems, water soluble resin systems or blends of the two systems. The water soluble resin systems are chiefly acrylics which are either thermosetting, thermoplastic or a blend of the two. Conventional water based inks include for instance latex systems as described in U.S. Pat. No. 3,533,811 the disclosure of which is incorporated herein by reference.

In the printing of designs on sheet vinyl covering materials, especially sheet vinyl flooring, it has previously been necessary to use hydrocarbon solvent based inks rather than water based inks to obtain satisfactory adhesion and quality. The solvents used with such solvent based inks frequently involve materials such as ketones and aromatic hydrocarbons which are considered hazardous and are subject to various anti-pollution rules and regulations. Water based inks have in the past been found to be unsatisfactory for use on vinyl plastics because of problems of adhesion and excessive mottle effect. These problems are especially severe in the printing of designs on sheet vinyl flooring where both good adhesion and a minimum of mottle effects are desired.

SUMMARY OF THE INVENTION

It is, therefore, an object of the present invention to provide water based ink compositions suitable for use in printing designs on vinyl plastic materials such as sheet vinyl flooring and a method for printing decorative designs on such surfaces using such inks.

In accordance with the invention a water based printing ink composition is provided which comprises the following ingredients: (a) a blend of acrylic latex and vinyl latex containing about between 20% and about 40% acrylic latex based on such blend; (b) at least about 5 wt % based on said latex blend of coalescing agent; (c) between about 30 and about 80 wt % based on total ink composition (d) between about 1 and about 5 wt % surfactant based on total ink composition; and (e) between about 10 and about 50 wt % pigment based on solids in the ink composition.

The process of the invention involves the printing of a decorative design on the surface of a layer of gelled or fused vinyl plastic using the water based ink composition of the invention.

The water based printing ink compositions of the invention comprise a blend of acrylic latex and vinyl latex, such blend containing between about 20% and about 40% acrylic latex. The composition also includes at least about 5 weight percent (wt. %) based on the latex blend of coalescing agent, between about 1 and about 5 wt % surfactant based on total ink composition, between about 10 and about 50 wt % pigment based on total ink composition and between about 30 and about 80 wt % water based on the total ink composition. In preferred embodiments of the invention the surfactant comprises trimethylnonyl polyethylene glycol ether (TMN) and the coalescing agent comprises butylcellosolve. The method of the invention involves printing a decorative design on the surface of a layer of gelled or fused vinyl plastic, preferably fused polyvinyl chloride (PVC) plastisol or organosol, using the ink compositions of the invention.

DETAILED DESCRIPTION OF THE INVENTION

As mentioned above, the ink composition of the invention basically comprises a blend of acrylic and vinyl latexes with vinyl latex comprising between about 20 and about 40% of the blend. The ink composition also contains at least about 5 wt percent based on latex blend of coalescing agent, between about 1 and about 5 wt % surfactant based on total composition, between about 10 and about 50 wt % pigment based on total composition and between about 30 and about 80 wt % water based on total composition.

Vinyl and acrylic latexes suitable for use in ink compositions of the invention include many of the latexes known for use in water based inks such as those described in the above mentioned U.S. Patent.

As mentioned above, the latex blend used in forming ink compositions of the invention should comprise between about 20 and about 40% acrylic latex (dry basis) based on latex blend with the remaining 60-80 wt % being vinyl latex. Preferred proportions, especially where relatively larger amounts of pigment are used, include blends where the acrylic latex content is between about 20% and about 30% based on the latex blend. While the amount of water used in compositions of the invention may vary considerably, the compositions normally comprise between about 30 and about 80 wt % water. A good deal of this water is, of course, present in aqueous solutions of the other ingredients of the composition. For instance, the latexes used in the compositions of the invention are frequently present in aqueous solutions containing between about 40 and about 60 wt % solids and the pigments used are frequently present in aqueous dispersions containing between about 15 and about 75 wt % solid pigment. In addition to water present in such aqueous solutions, additional water in quantities up to about 20 wt % is frequently added as desired to bring the total water content of the compositions to the range of between about 30 and 80 wt %.

Coalescing agents used in the invention are those conventional for use with water based inks and are generally high boiling solvents incorporated in the composition to aid in film formation. It has been found that ink compositions of the invention are especially effective in printing designs on vinyl plastic substrates when Butyl Cellosolve is utilized as at least a portion of the coalescing agent required by the invention. In preferred embodiments of the invention the total amount of coalescing agent used is between about 5 and about 15 wt % of the ink composition and in a more preferred embodiment of the invention Butyl Cellosolve (ethylene glycol monobutyl ether) is present in amounts between about 5 and about 15 wt % of the ink composition. The presence of the Butyl Cellosolve coalescing agent tends to reduce the mottle effect more than the use of other coalescing agents; however, once the desired amount of Butyl Cellosolve is present in the preferred embodiments of the invention, it is possible to utilize additional amounts of other coalescing agents. The use of coalescing agents in amounts in excess of 15 wt % based on the total composition, while not harmful, is not usually beneficial. In fact, for most applications it has been found that the use of coalescing agents in excess of about 10 wt % of the ink composition generally adds comparatively little to the beneficial effects obtained by the use of about 5 to about 10 wt % of such coalescing agent. In addition to the especially desirable Butyl Cellosolve coalescing agent, additional coalescing agents suitable for use in the invention include for instance propyleneglycol, glycerine, hexaylene glycol, diethylene glycol monoethyl ether, ethylene glycol, Butyl Cellosolve acetate, etc.

Surfactants suitable for use in the ink compositions of the invention include any of the conventional surfactants for use in water based inks such as the water miscible organic solvents described in the above mentioned U.S. Pat. No. 3,533,811. Trimethylnonyl polyethylene glycol ether (TMN) is however, a preferred surfactant for use in the invention since it's use appears to give less undesirable mottle effect than other conventional surfactants, even those which are relatively closely related chemically. As mentioned above, surfactant is used in the compositions of the invention in amounts between about 1 and about 5 wt % of the total composition.

Pigment is present in compositions of the invention in amounts generally ranging between about 10 and about 50 wt % based on solids in the composition. Suitable pigments include generally any of those considered suitable for use in water based inks such as the pigments described in the above mentioned U.S. Pat. No. 3,533,811. Pigments are frequently applied in the form of aqueous solutions as described above and may contain additional conventional ingredients such as small amounts of surfactants (frequently on the order of 1 or 2 wt %), glycol (frequently present in amounts between about 5 and about 15 wt % of the pigment solution), wetting agents, etc.

In addition to the essential components of the composition of the invention mentioned above, additional ingredients conventionally used in water based inks may be used. These include for instance conventional thickeners, defoamers, alcohols, biocides etc. such as those described in the above mentioned U.S. Patent. Such additional materials are generally present in relatively small amounts. For instance thickeners, when used, are conventionally present in amounts between about 0.5 and 3 lbs dry thickener per 100 gallons of ink composition while defoamers or biocides are generally present in amounts between about 5 and about 10 lbs per 100 gallons of ink composition. Other ingredients when present are usually present in amounts less than about 5 wt % of the composition.

The process of the invention involves the use of the ink composition of the invention to print a decorative design on the surface of layer of gelled or fused vinyl plastic. While a wide variety of vinyl plastic substrates are suitable for this purpose, the invention is particularly useful in the printing of designs on PVC plastisol or organosol layers of sheet vinyl flooring material. These substrates are where the most difficulty has been encountered previously in using water based inks. Conventional water based inks, when used on such vinyl substrates, tend to lack good adhesion and present an undesirable mottled or veiny appearance. By using the compositions of the present invention, it is possible to print designs satisfactorily on such substrates.

Substrates on which designs are printed in accordance with the invention may be any gelled or fused vinyl plastic but are preferably gelled layers of PVC plastisol or organosol. Suitable compositions for such vinyl plastic substrates include any of the compositions normally used in the manufacture of sheet vinyl flooring material and include for instance the vinyl materials described in more detail in U.S. Pat. No. 3,293,094 the disclosure of which is incorporated herein by reference.

In the practice of the process of the invention the composition of the invention may be applied to the substrate in any conventional manner such as by the use of conventional rotogravure techniques, etc.

EXAMPLE

A water based ink composition according to the invention was prepared with the following formulation:

| Ingredient | Weight % |
| --- | --- |
| Vinyl latex* | 24.3 |
| Acrylic latex** | 6.4 |
| Total water | 44.5 |
| TMN (6 mols ethylene oxide) | 1.7 |
| Butyl Cellosolve | 2.9 |
| Propylene glycol | 2.9 |
| biocide | 0.6 |
| Defoamer | 0.6 |
| thickener | 1.7 |
| Pigment*** | 14.5 |

*B.F. Goodrich Company's Geon 576-(vinyl chloride and acrylic preplasticized with 35% dioctylpthalate, used as 56% solids in aqueous solution)
**Rohm and Haas Company's Rhoplex AC-25 (46–47% acrylic solids in aqueous solution)
***Daniel Black WE-2350 (36% aqueous solution of black pigment, included surfactant, 6% glycol and traces of wetting agent)

The above water base ink composition was used to print a decorative design on a gelled layer of PVC plastisol during production of a sheet of vinyl flooring material. Following application of the printed design, the design was overlaid with a conventional PVC plastisol wear layer and the entire flooring sheet was heated to fuse the plastisol layers. The resulting design as seen through the clear wear layer displayed remarkably fine mottle, i.e. lack of undesirable mottle effect, and exhibited good adhesion to both the underlying plastisol layer and the wear layer.

While the invention has been described with respect to preferred embodiments thereof, it will be understood by those skilled in the art that various changes or modifications may be made without departing from the spirit or scope of the invention.

What I claim is:

1. A water-based printing ink composition comprising:
    (a) a blend of acrylic latex selected from the group consisting of polymers and copolymers of acrylic acid, methacrylic acid, methyl methacrylate, methyl acrylate, ethyl acrylate, ethyl methacrylate and vinyl latex selected from the group consisting of polymers and copolymers of vinyl acetate and vinyl chloride, such latex blend containing between about 20% and about 40% acrylic latex based on such blend;
    (b) At least about 5 wt % based upon said latex blend of coalescing agent selected from the group consisting of ethylene glycol monobutylether, propylene glycol, glycerine, hexylene glycol, diethylene glycol monoethyl ether, ethylene glycol and ethylene glycol monobutyl ether acetate;
    (c) between about 30 and about 80 wt % water based on total ink composition;
    (d) between about 1 and about 5 wt % surfactant based on total ink composition; and
    (e) between about 10 and about 50 wt % pigment based on solids in the ink composition.

2. An ink composition according to claim 1 wherein the surfactant is trimethylnonyl polyethylene glycol ether which is soluble in the ink composition.

3. An ink composition according to claim 1 wherein the coalescing agent is present in amounts between about 5 and about 15 wt % based on the latex blend.

4. An ink composition according to claim 3 wherein the coalescing agent comprises ethylene glycol monobutyl ether.

5. An ink composition according to claim 4 wherein the coalescing agent also includes propylene glycol.

6. An ink composition according to claim 1 wherein the surfactant comprises trimethylnonyl polyethylene glycol ether soluble in the ink composition and the coalescing agent comprises a mixture of butyl cellosolve and propylene glycol and is present in amounts between about 5 and about 15 wt % based on latex blend.

* * * * *